I. B. GOLDEN.
BREAD RACK.
APPLICATION FILED OCT. 26, 1912.
1,072,000.
Patented Sept. 2, 1913.
2 SHEETS—SHEET 1.
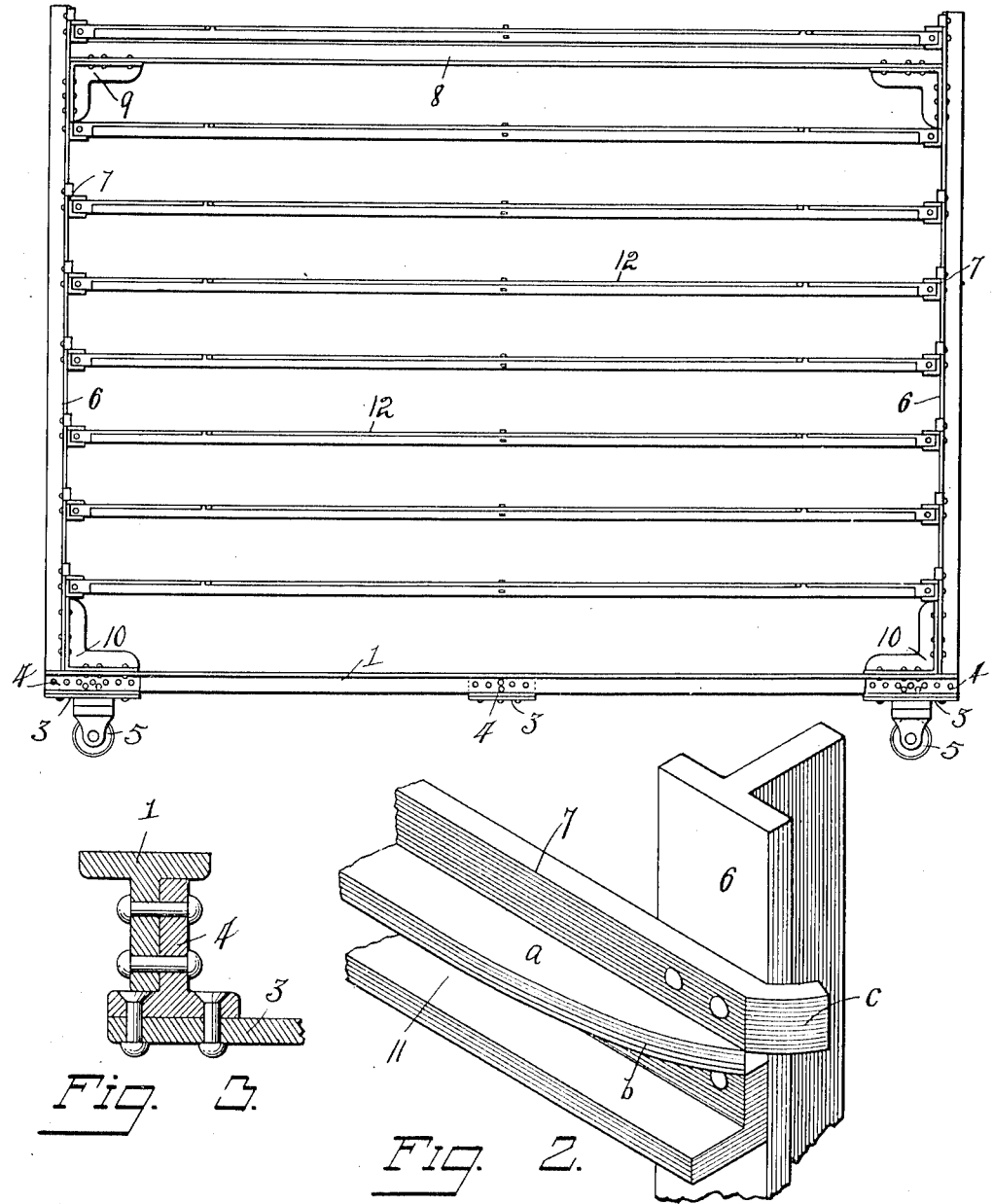
WITNESSES:
INVENTOR.
Irving B. Golden,
By Owen & Owen,
His attys.

I. B. GOLDEN.
BREAD RACK.
APPLICATION FILED OCT. 26, 1912.
1,072,000.
Patented Sept. 2, 1913.
2 SHEETS—SHEET 2.
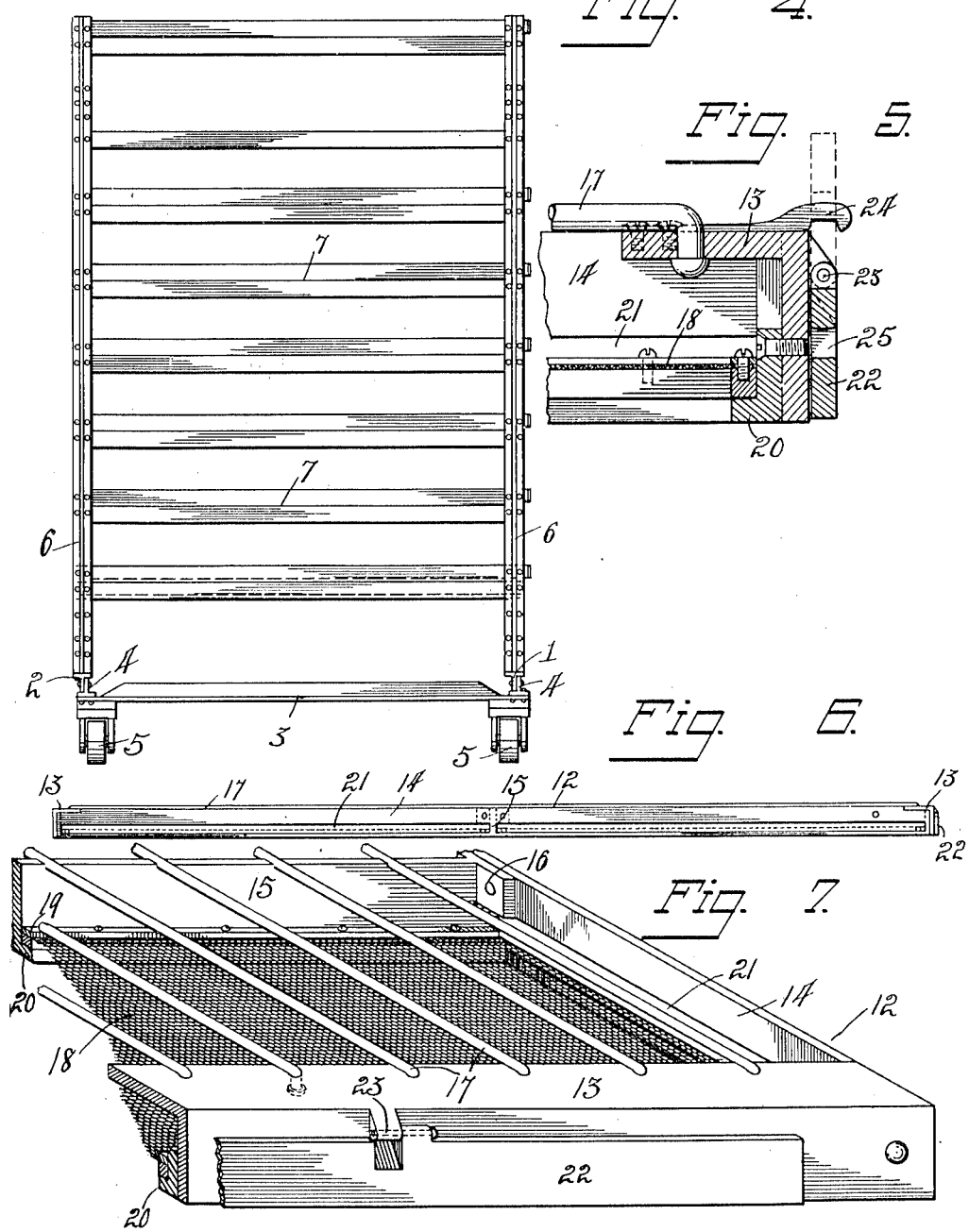

UNITED STATES PATENT OFFICE.

IRVING B. GOLDEN, OF TOLEDO, OHIO.

BREAD-RACK.

1,072,000.  Specification of Letters Patent.  Patented Sept. 2, 1913.

Application filed October 26, 1912. Serial No. 727,963.

*To all whom it may concern:*

Be it known that I, IRVING B. GOLDEN, a citizen of the United States, and a resident of Toledo, in the county of Lucas and State of Ohio, have invented a certain new and useful Bread-Rack; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.
My invention relates to apparatus for use in connection with the manufacture of bread and similar products, and has particular reference to a bread cooling and proofing rack, but is not restricted to such use, as it may be used in any connection for which it may be adapted or appropriate.

The object of my invention is the provision of an improved sanitary rack of this character, which is simple, strong and durable in its construction, and admirably adapted for use as a proofing rack for holding molded loaves before baking and as a cooling rack for baked loaves.

A further object is the provision in a rack of this character of means for catching the grease, flour, crumbs, dirt, etc., dropping from dough pans and from baked loaves to prevent such droppings from falling on subjacent loaves to their injury, which means is removable from the rack for cleaning purposes.

Further objects of the invention will be apparent from the following detailed description.
The invention is fully described in the following specification, and while, in its broader aspect, it is capable of embodiment in numerous forms, a preferred embodiment thereof is illustrated in the accompanying drawings, in which—

Figure 1 is a front elevation of a rack embodying my invention with the article supporting shelves carried thereby. Fig. 2 is an enlarged perspective view of portions of a corner standard and one of the attached shelf guide-ways. Fig. 3 is an enlarged sectional detail of the base reinforcing means of the rack. Fig. 4 is an end elevation of the rack. Fig. 5 is an enlarged sectional view of a front portion of one of the removable shelves. Fig. 6 is an enlarged side view of one of said shelves, and Fig. 7 is an enlarged perspective view of a portion thereof.

Referring to the drawings, 1 and 2 designate the front and rear horizontal bars or members of the rack and are rigidly spaced apart at their ends and center by cross-pieces 3, all of said bars being preferably of T-iron, as shown, with their flat sides disposed upward. The ends of the cross-pieces 3 are shown as being riveted or otherwise suitably secured to T-iron reinforcing-pieces 4, which are attached to the bars 1 and 2 in inverted relation thereto with their leg portions lapping the leg portions of the respective bars and riveted thereto, and with their plain faces disposed below said bars to provide broadened surfaces to which the ends of the cross-piece 3 may be riveted. The rectangular base frame, which is thus formed by the bars 1, 2 and 3, is mounted at the corners thereof on casters 5 to facilitate a movement of the rack from one position to another.

Rising from the corner portions of the base frame are uprights 6 which are preferably of T-bar form with their flat sides facing inward toward the opposite end of the rack. The uprights 6 are relatively braced transversely of the rack by spaced sets of double angle-iron bars 7 the ends of which lap the inner flat sides of the uprights and are riveted or otherwise fixedly attached thereto. The uprights 6 are connected lengthwise of the frame at the front and back thereof by bars 8 which are preferably of T-iron construction and secured at their ends to corner brackets 9, which are attached to the respective uprights. Similar brackets 10 are also disposed in the corners formed by the uprights and the front and rear base bars 1 and 2 and riveted or otherwise suitably attached thereto to assist in relatively bracing the parts of the rack frame. The bars of each set 7, which are preferably of angle-iron form, are placed one over the other with their vertical flanges extending upward and their horizontal flanges coöperating to form a guideway 11 (see Fig. 2) within which an end of a shelf 12 may be slidably mounted.

The shelves 12 are of rectangular form and preferably comprise the longitudinally extending front and rear angle-iron bars 13, 13, which are connected at their ends by cross-pieces or end strips 14, and each has one flange extending downward at its outer side and its other flange extending inward at its top edge. A center-strip 15 extends from one to the other of the end pieces 14, being rigidly secured thereto, as at 16, Fig. 7, said center-piece being disposed substantially midway between the front and rear bars 13 in parallelism therewith, and coöperating with such bars to support the spaced cross-rods 17. The ends of these cross-rods are preferably bent at right angles and projected through registering apertures in the horizontal flanges of the respective bars 13, 13 and headed at the under sides of such bar flanges to prevent their withdrawal from the apertures. The bars 17 are sufficiently close together to support the loaves of bread, which are intended to be placed thereon either for proofing purposes before baking or for cooling after baking.

In the use of racks of this character, it is found that grease from the bread pans, or flour, crumbs and the like, drop from the loaves or pans through the grated shelves and onto loaves on subjacent shelves to the injury of such loaves. To prevent the dropping of such grease or other matter from one shelf to another, each shelf is provided below the grated bars 17 with a screen 18 of sufficient fineness to prevent the passage of grease and fine crumbs therethrough, but which is not so fine as to prevent the free circulation of air and gases upward or downward through the screens, as such circulation is necessary to satisfactory results in the proofing of bread. The screens 18 are mounted on rectangular frames 19, such frames being of a shape and size to fit into the compartments formed in the shelves by the interposing of the center strip 15 therein. To enable the screens 18—19 to be easily removed for the purpose of cleaning, the lower side edges of the center-piece 15 and the lower inner edges of the front and rear bars 13 are provided with inwardly projecting flanges or ledges 20 upon which the screen frames may loosely rest, and one end 14 of each shelf is provided with an opening 21 through which the screens may be inserted into position within a shelf or withdrawn therefrom, as desired.

Each shelf 12 is preferably provided at the front side edge thereof with a hinged gate member or protector strip 22 which extends longitudinally of the shelf front and has one edge hingedly connected to the front shelf bar 13 adjacent to its top edge, as shown at 23. This protector strip may be swung down to inoperative position, as shown in Fig. 7, and in full lines in Fig. 5, or it may be swung upward into vertical position with its upper portion projecting above the surface of the shelf to protect the loaves on the shelf and prevent them from falling or sliding forward from the shelf. A spring catch member 24 is mounted on the top side of the front shelf bar 13 and when the gate or protector strip 22 is raised to upright position, works through a registering aperture 25 therein and interengages with an edge thereof to hold it in such position.

In order to prevent the loaves which may be placed near the end edges of a shelf from being pushed from the shelf when the shelf is being inserted into the guide-ways 11 of the receptive bar sets 7, due to the forward end of the upper horizontal flange $a$ of the bar sets striking the loaves, such flange ends are rounded off to adjacent the vertical flanges of the respective bars, as shown at $b$, thus tending to force registering loaves inward upon the shelves rather than forward therefrom and off the shelf, as would otherwise be the case. This feature of the guide-bars 7 is further augmented by extending the forward end of the vertical flange of the upper guide-bar of each set beyond the forward edge of the corner upright 6 to which it is attached and bending it outward in curved form, as shown at $c$ in Fig. 2.

It is found in practice that shelves of the construction described contribute materially to the efficiency and sanitary features of apparatus of this class and that the provision of the screens in the shelves while entirely preventing the falling of grease, crumbs or dirt from one shelf to another, does not prevent the free circulation of carbonic gases within the racks and around the loaves when the racks are used for proofing purposes, and in no way retards or detrimentally affects the fermenting process of loaves which are placed thereon before being baked.

I wish it understood that my invention is not limited to any specific construction, arrangement or form of the parts except in so far as such limitations are specified in the claims.

Having thus described my invention, what I claim as new and desire to secure by Letters Patent, is—

1. A rack of the class described, comprising a base frame having front and rear longitudinally extending T-bars with their flat sides disposed upward, T-bar reinforcing strips attached in inverted relation to the vertical flanges of said bars, said strips being disposed at the ends and center of said bars, cross-bars connected at their ends to said reinforcing strips and rigidly spacing the longitudinal bars of the frame, T-bars rising from the corners of said frame with their flat sides facing the opposite end of the rack, means bracing said corner T-bars against relative movements lengthwise of the frame, and a plurality of sets of bars extending horizontally from the inner side of one corner bar to the inner side of the adjacent corner bar and forming guide-ways for shelves.

2. In a rack of the class described, a plurality of upright members and a plurality of double angle-iron bar sets connecting adjacent standards, the bars of each set having their vertical flanges extending upward and their horizontal flanges extending inward to coöperate to form a shelf guiding way, with the upper horizontal flange rounded off at its forward end.

3. In a rack of the character described, corner uprights and a plurality of sets of double angle-iron bars connecting the adjacent end uprights, the bars of each set resting one upon the other with their horizontal flanges projecting inward to coöperate to form a shelf guiding-way and with the vertical flanges projecting upward, the upper horizontal flange having its forward end rounded off and the upper vertical flange having its forward end extended relative to the other flanges and curved outward.

In testimony whereof, I have hereunto signed my name to this specification in the presence of two subscribing witnesses.

IRVING B. GOLDEN.

Witnesses:
C. W. OWEN,
E. E. THOMAS.